United States Patent [19]

Holopainen

[11] Patent Number: 4,729,711

[45] Date of Patent: Mar. 8, 1988

[54] HAND TRUCK

[75] Inventor: Vaino J. Holopainen, Moultonboro Neck, N.H.

[73] Assignee: Charles E. Thorndike, Meredith, N.H.

[21] Appl. No.: 908,175

[22] Filed: Sep. 16, 1986

[51] Int. Cl.[4] .............................................. B65G 7/12
[52] U.S. Cl. .................................. 414/454; 294/104; 414/490; 414/911
[58] Field of Search ................. 414/453–457, 414/490, 618, 622, 704, 721, 911; 294/11, 50.9, 104, 105

[56] References Cited

U.S. PATENT DOCUMENTS

| | | | |
|---|---|---|---|
| 2,329,439 | 9/1943 | Hanssen | 414/453 |
| 2,506,471 | 5/1950 | Siegal | 414/453 |
| 2,598,515 | 5/1952 | Dickson | 414/622 |
| 2,599,855 | 6/1952 | Michaux, Jr. | 414/622 |
| 2,877,912 | 3/1959 | Giacomo | 414/454 X |
| 2,906,420 | 9/1959 | Garcia, Jr. | 414/456 X |
| 2,998,151 | 8/1961 | Sampson | 414/454 X |
| 3,178,215 | 4/1965 | Reeves | 294/104 X |
| 4,155,473 | 5/1979 | Holopainen | 414/704 |
| 4,244,595 | 1/1981 | Sagert | 414/490 X |
| 4,264,252 | 4/1981 | Jennings et al. | 294/105 X |
| 4,403,906 | 9/1983 | Holopainen | 414/724 |
| 4,637,769 | 1/1987 | Thorndike | 414/454 |

Primary Examiner—Robert J. Spar
Assistant Examiner—David A. Bucci
Attorney, Agent, or Firm—Cesari and McKenna

[57] ABSTRACT

A hand truck for lifting and transporting objects. The truck includes an elongated frame attached to a wheel assembly. A carriage is mounted on the frame to travel the length of the frame. The carriage includes a load bed that extends across the frame, and at least one protuberance located below the load bed that extends above the load bed. A seizing arm is pivotally attached to the carriage above the load body and has a seizing arm with a grip point directed toward the load body. The seizing arm has a stem that extends beyond the pivot point attachment opposite the seizing arm body. A winch with cable are attached to the top of the frame. The free end of the cable is attached to the seizing arm stem. Retracting the cable causes the seizing arm to pivot so the grip point is forced against as object located on the carriage. The force of the seizing arm is sufficient to secure the object between the grip point and the carriage. If the cable is retracted further, the carriage, with the object secured to it, is pulled up the frame to a desired elevation.

10 Claims, 4 Drawing Figures

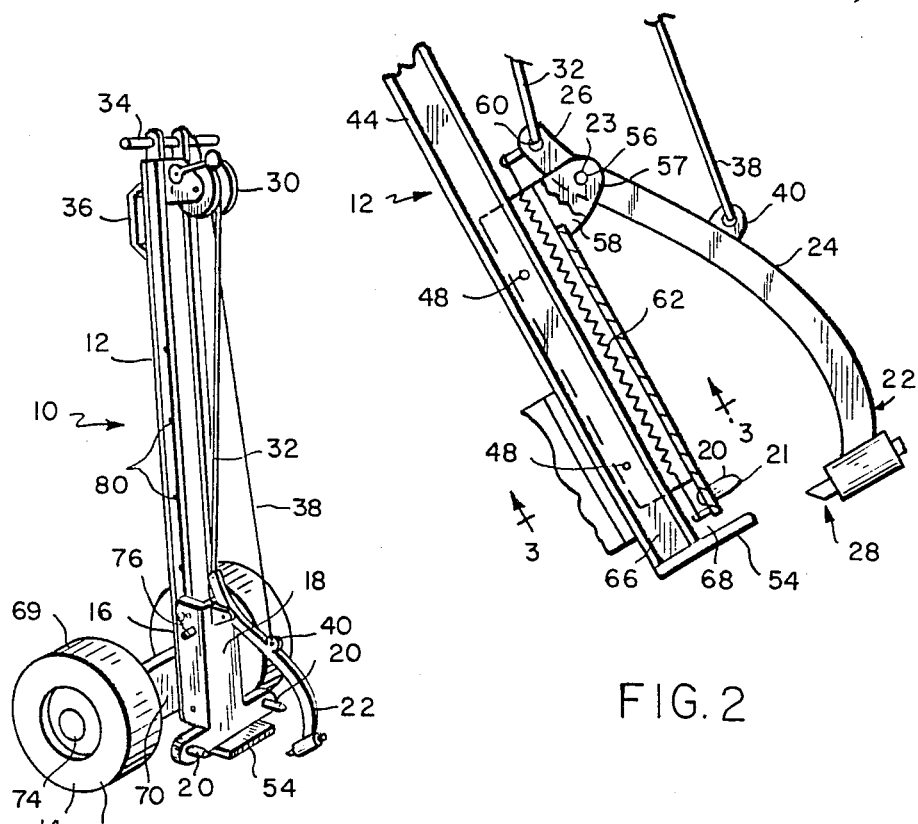
FIG. 1
FIG. 2
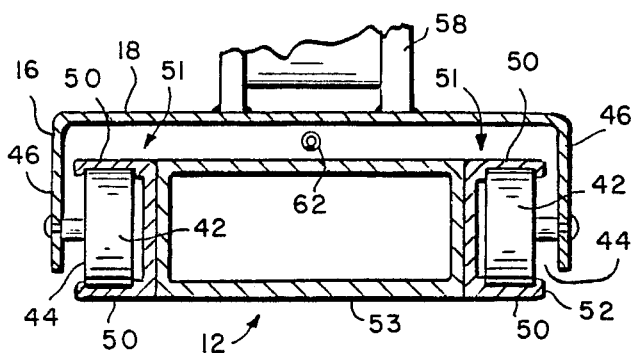
FIG. 3

HAND TRUCK

FIELD OF THE INVENTION

This invention relates to an improved apparatus for carrying loads, and in particular to a hand truck for lifting and transporting logs, stones, and other heavy objects.

BACKGROUND OF THE INVENTION

Hand trucks have been adapted in various ways to facilitate the carrying of loads. U.S. patent application Ser. No. 698,110, filed Feb. 4, 1985, now U.S. Pat. No. 4,637,769, by the same party as this patent is assigned to, discloses a hand truck for carrying heavy objects. The hand truck includes a frame mounted on a wheel assembly. The lower portion of the frame serves as a bed on which objects can be supported. At the base of the frame is a heel, or a plurality of projections that extend out above the frame bed. A hook, hingedly secured to the frame above the frame bed, has a grip point that is oriented toward the frame bed. When an object is placed on the truck, gravity forces the hook downward so that the object is seized by the grip point and secured to the frame bed. Stabilizing wedges on the frame urge the object toward the grip point to insure that the object continually remains seized by the grip point. Thus, the object will remain secured to the hand truck while it is being transported thereon.

Current hand trucks, though useful, can transport objects only from one ground or floor location to another. They cannot be used to load or unload objects that are located a few feet off the ground. Thus, when it is necessary to transport an object to or from an elevated area, such as a work station, or a storage location, it is usually necessary to manually lower or raise the object to or from the ground. Often the objects to be transported are too heavy for one person to raise or lower. Also, some objects, such as large logs and stones, are without grasping points and are rather bulky, and thus are difficult to hold onto. This adds to the difficulty of lifting and lowering these objects.

Furthermore, with many hand trucks, the strength of the seizing or grasping arm is gravity dependent. In some situations, such as transporting objects outdoors or over uneven terrain, the force exerted by the arm may be insufficient to securely hold the object to the hand truck in the face of the jarring motion encountered in moving over such terrain. The operator may have to use considerable care in transporting the objects, or the object may work itself free of the truck. If the object does come free of the hand truck, the operator must then resecure it to the truck. Moreover, in some situations the terrain may be such that the seizing arm cannot secure the object in place on the truck even with great care by the operator. In such instances it may be impossible to use the hand truck and the objects have to be transported manually.

A need therefore exists for a new carrying apparatus for transporting heavy objects. The apparatus should be able to transport objects and be able to elevate them above or lower them to the ground. The new apparatus should also have a means to keep the objects firmly secured to the truck while being transported, regardless of the terrain the apparatus travels. In addition the apparatus should be relatively simple to operate and not require the operator to exert significant physical effort.

SUMMARY OF THE INVENTION

This invention comprises a hand truck that includes a normally upright frame that is attached to a wheel assembly. A carriage that includes a load bed is mounted to the frame by a set of wheels so that it can easily travel the entire length of the frame. A plurality of carriage pins located at the bottom of the carriage extend out above the load bed. A seizing arm, pivotally connected to the carriage above the load bed, has a grip point that is directed toward the frame. The grip point is positioned so that when adjacent to the frame it is directly beneath the carriage pins. The seizing arm also has a stem that extends above the pivot point. The stem is connected by a cable to a hand operated winch located at the top of the frame.

To use the hand truck, it is first positioned so the carriage load bed is adjacent to the object to be transported, the carriage pins are under the object, and the seizing arm is located above the object. The cable is then retracted by operation of the winch so as to rotate the arm about its pivot. This forces the grip point against the object on the load bed. The object is thus firmly held against either the carriage pins or the load bed by the seizing arm and will stay secured to the hand truck even while being transported over rough terrain.

It is also possible to raise and lower the object after it is secured to the hand truck. After the grip pin is in place against the object, further retraction of the cable will pull the carriage up the frame toward the winch. Since the object is secured to the carrier, it will rise along with the carrier. The object can thus be raised almost the full height of the hand truck for placement at a work station, storage location or any other elevated location. The hand truck may also be used in a similar manner to lower an object from an elevated location.

BRIEF DESCRIPTION OF THE DRAWINGS

FIG. 1 is a side view of the hand truck of this invention.

FIG. 2 is a cut away side view of the carrier mounted to the frame of the hand truck of this invention.

FIG. 3 is a cross sectional view of the frame and carriage of the hand truck of this invention taken along line 3—3 of FIG. 2.

DETAILED DESCRIPTION OF THE PREFERRED EMBODIMENTS

Figure 4:
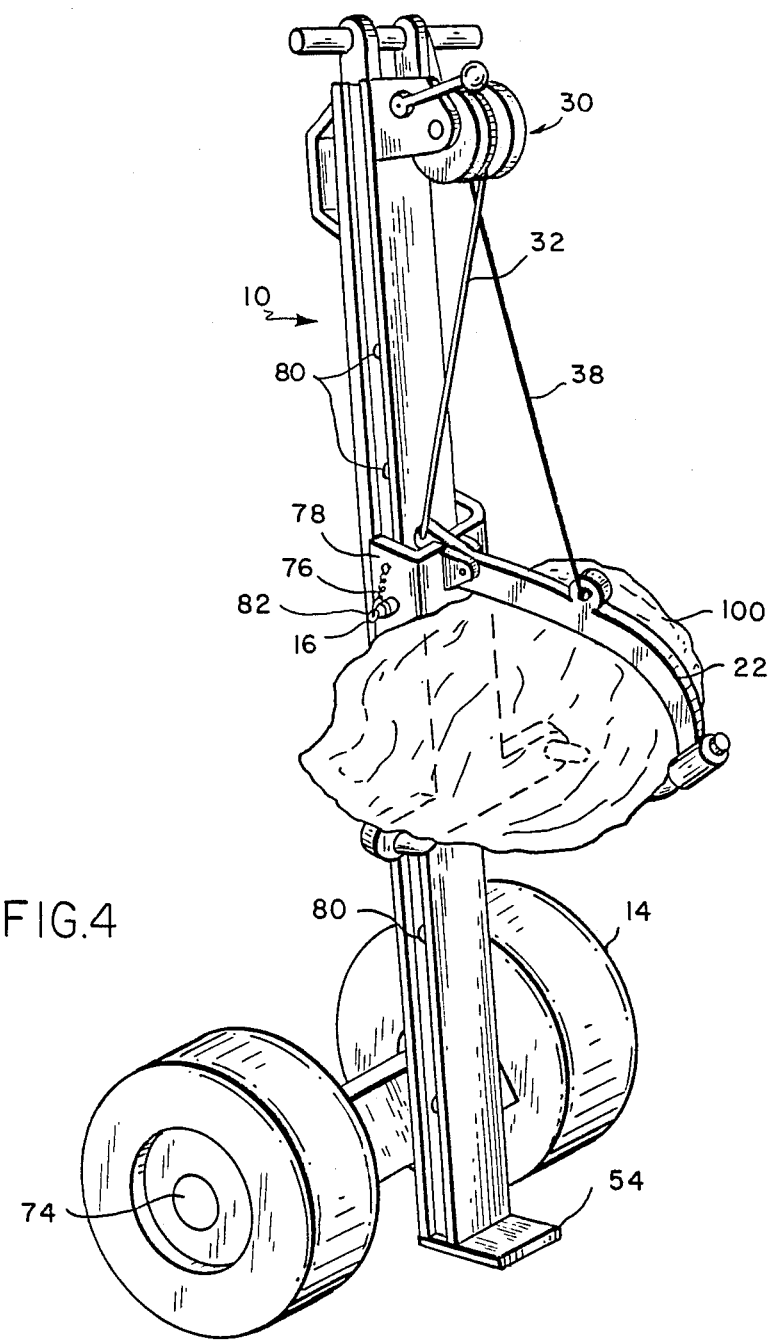
FIG. 4 is a side view of the hand truck of this invention positioned to transport and lift a stone.

As illustrated in FIG. 1 a hand truck 10 includes a frame 12 supported on a wheel assembly 14. A carriage 16 is mounted to the frame to travel the length of the frame. The carriage has a flat load bed 18 that extends across the frame, and a horizontal cross bar 19 located below the load bed that extends out from the sides of the carriage. At each end of the cross bar there is a carriage pin 20 that extends a short distance, e.g. 3 inches, from the surface of the load bed. Each of the carriage pins includes a beveled face 21 that ends in an edge at the outer end of the pin.

A seizing arm 22 is mounted to the carriage at a pivot 23 spaced from the load bed. The arm 22 comprises a curved body 24 that is directed away from the load bed, and a stem 26, above the pivot 23, that extends upwardly and inwardly toward the frame 12. A grip pin 28, at the end of the body 24, projects toward the frame. The grip pin is positioned at the end of the arm body 24 so that when it is adjacent to the frame it is directly beneath the carriage pins 20. Thus, there is an overbite between the grip pin 28 and the carriage pins 20, best seen in FIG. 2. A hand operated ratchet winch 30 is attached to the top of the frame and is connected to the seizing arm stem 26 by a cable 32. The top of the frame is provided with a lateral handle 34 across the frame, and a U-shaped grip 36 affixed to the bottom of the frame. A tether line 38 extends between a eye 40 on the seizing arm and the frame handle.

As best seen in FIGS. 2 and 3 the carriage 16 is shown mounted to the frame 12 by two pairs of wheels 42, on opposite sides 46 of the carriage, that travel within tracks 44. The wheels are rotatively mounted to the carriage sides by inwardly extending axles 48. Each track is defined by a pair of parallel of rails 50 that extend laterally outward from the frame. The rails are part of oppositely directed U-shaped beams 51 that are attached to a box member 53 that serves as the frame 12. Each rail is provided with a flange 52 that is directed over the outer radius of the wheels 42 so as to secure the wheels within the track. A stop plate 54 that extends horizontally from the base of the frame limits the downward movement of the carriage.

As shown in detail in FIG. 2 the seizing arm is rotatably attached to the carriage by a pivot pin 56 that extends through a mounting bore 57 located at the pivot 23. The pivot pin 56 is affixed to the top of a pivot frame 58 that is attached to the carriage above the load bed 18. The cable 32 is attached to the seizing arm stem 26 through a hole 60 located at the distal end of the stem away from the pivot point. A biasing spring 62 is attached at one end to the stem through the hole 60, extends under the load bed above the frame, and attached at the opposite end to a carriage base plate 68 located at the base of the cross bar 19 by an eye bolt 66. When the cable 32 is slack the biasing spring exerts sufficient force on the seizing arm so the arm is rotated up away from the load bed.

Referring again to FIG. 1, the wheel assembly 14 includes a truck 69 having a cross member 70 that is attached to the lower end of the frame 12. A pair of wheels 72 are mounted for rotation to the carriage by an axle 74 that extends through side panels (not shown) on the truck. The wheels are spaced apart so they are outside of the carriage cross bar 19. Alternative wheel assemblies can be provided. For example a four wheel, two axle assembly can also be used. With such an assembly it may be desirable to have the frame 12 hingedly attached to the wheel assembly so the frame can be pivoted. Alternatively, a treaded assembly may be useful in transporting a load over soft or very uneven terrain.

As illustrated in FIG. 4 the hand truck may be used to transport and lift heavy and bulky objects such as a stone 100. The hand truck is positioned next to the object so the object is against the load bed 18. Since the carriage pins 20 have a relatively short length there is no need for the operator to expand a large amount of effort to force the pins under, or against, the object. The cable 32 is retracted by turning the winch 30. The cable pulls the seizing arm stem 26 away from the carriage so as to pivot the arm 22 about the pivot point 23. The seizing arm body 24 is rotated towards the load bed and the grip pin 28 is forced against the object. The cable is retracted until the grip pin exerts a sufficient force so that the object is gripped, or held between, the grip pin and either the load bed 18 or the carriage pins 20. If the object is gripped between the seizing arm and the load bed, the carriage pins provide vertical support to keep the object from falling off the load bed. The overbite between the carriage pins 20 and the grip pin 28 also insures that the object is securely held to the load bed 18. Once the object is so secured it may be transported to a desired location by the hand truck. With a single axle wheel assembly 14 or a hinged wheel assembly the frame 12 may be pivoted around the assembly. Grip 36 at the top of the frame serves as a base so the frame may be rested horizontally.

Also, the object may be lifted once it is secured to the carriage. This is done by further retracting the cable 32 so the carriage 16 with the object secured to it, is pulled up along the frame 12. Once the carriage is at the desired height it maybe secured to the frame by a locking rod 76. The locking rod is inserted into a pair of vertically aligned rod openings 78 in the sides 46 of the carriage below the upper set of wheels 42, and into a pair of vertically alligned rod openings 80 in the frame between the rails 50. The frame is provided with a number of spaced apart pairs of rod openings 80 so the carriage can be secured to the frame at any position along the frame. The locking rod is attached to the carriage 16 by an eye-and-chain 82 attached to one of the sides 46.

After the object is transported to the desired location and height it may be released from the hand truck by slackening the cable 32 and pulling the tether line 38 so the seizing arm 22 is moved away from the object. This movement releases the force the grip pin exerted on the object, thus freeing the object from the carriage.

The hand truck can also be used to lower objects by first setting the empty carriage at a height so it is adjacent to the object to be transported. The object can then be secured to the carriage for both lowering and transport.

Alternative embodiments of the hand truck of this invention may be offered without departing from the scope of the invention. For example, the carriage pins 20 may be replaced with a rake frame, nose blades, a tote box or another type of attachment provided to extend from the surface of the load bed 18. These attachments may be desirable if the hand truck is to be used to transport construction material, extremely large stones, or other objects requiring special support. For some purposes it may be desirable to provide the load bed with an uneven surface, or a number of projections, to have a maximum gripping effect between the load bed and the grip pin or the seizing arm. Also, it may be desirable to provide the carriage 16 with a brake to prevent it from traveling when the frame 12 is pivoted to the horizontal. This brake may take the form of a shoe attached to the seizing arm 22 on or near the stem 26 and directed toward the frame 12. The shoe would be set to push against the frame and stop the carriage from traveling, whenever the frame is set horizontally. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A hand truck for transporting and lifting a load composing:

(A) an elongated frame having an upper and lower end;

(B) a wheel assembly attached to the lower end of the frame;

(C) a carriage mounted on the frame and adapted to freely travel the length of the frame, the carriage having a load bed that extends across the frame, and at least one protrusion below the load bed that extends above the surface of the load bed;

(D) a seizing arm pivotally attached at a pivot point to the carriage above the load bed, the seizing arm having a body with a securing means directed toward said load bed; and (E) a single actuator for forcing the seizing arm towards the load bed so that an object placed on the load bed is secured between the seizing arm and the carriage, and then for positioning the carriage along the frame.

2. The assembly of claim 1 whereas the single actuator for forcing the seizing arm towards the load bed and positioning the carriage comprises;

(A) a seizing arm stem directed away from the seizing arm body from the pivot point; and (B) a cable and winch attached to the upper end of the frame, a free end of the cable attached to the seizing arm stem.

3. The assembly of claim 1 further comprising:

(A) the frame further including two diametrically opposed tracks, each track defined by two parallel spaced apart rails that extend out laterally from the frame; and (B) the carriage further including at least one wheel on each side of the load bed, each wheel rotatively mounted to the carriage and positioned to travel inside the adjacent frame track.

4. The assembly of claim 3 wherein the carriage is provided with sides over the adjacent frame tracks from which the wheels are rotatively mounted thereon.

5. The assembly of claim 1 wherein the carriage further includes:

(A) a horizontal cross bar located below the load bed that extends equadistally beyond the sides of the carriage; and (B) at least one carriage pin located on the cross bar that extends above the surface of the load bed.

6. The assembly of claim 2 wherein a biasing spring is located between the carriage and the frame, and extends between the seizing arm stem and a carriage base plate located below the load bed.

7. The assembly of claim 1 further including a grip point located at the end of the seizing arm body directed towards the load bed for abutting against an object placed thereon.

8. The assembly of claim 1 whereas a tether line is connected between the seizing arm body and the top of the frame.

9. The assembly of claim 1 wherein a U-shaped grip is attached to the upper end of the frame opposite the surface of the frame the load bed travels over.

10. The assembly of claim 1 further including a means to secure the carriage to the frame at selected locations along the length of the frame.

* * * * *